(12) United States Patent  
Peercy

(10) Patent No.: US 7,116,333 B1
(45) Date of Patent: Oct. 3, 2006

(54) DATA RETRIEVAL METHOD AND SYSTEM

(75) Inventor: Mark S. Peercy, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/569,520

(22) Filed: May 12, 2000

(51) Int. Cl.
*G09G 5/00* (2006.01)
*G06T 11/40* (2006.01)
*G09G 5/36* (2006.01)
*G06T 11/20* (2006.01)

(52) U.S. Cl. ............... 345/582; 345/549; 345/552; 345/586; 382/305

(58) Field of Classification Search ........ 345/418–428, 345/581–589, 596–599, 501–506, 530, 520, 345/522, 536, 537–541, 545, 547, 549, 552, 345/606–607, 611–612, 618; 382/254, 300, 382/305, 162
See application file for complete search history.

(56) References Cited

U.S. PATENT DOCUMENTS

| | | | |
|---|---|---|---|
| 5,537,638 A * | 7/1996 | Morita et al. | 345/426 |
| 5,793,386 A * | 8/1998 | Larson et al. | 345/553 |
| 5,844,571 A * | 12/1998 | Narayanaswami | 345/422 |
| 6,111,584 A * | 8/2000 | Murphy | 345/582 |
| 6,268,875 B1 * | 7/2001 | Duluk, Jr. et al. | 345/506 |
| 6,275,235 B1 * | 8/2001 | Morgan, III | 345/582 |
| 6,288,730 B1 * | 9/2001 | Duluk, Jr. et al. | 345/552 |
| 6,292,191 B1 * | 9/2001 | Vaswani et al. | 345/582 |
| 6,323,860 B1 * | 11/2001 | Zhu et al. | 345/427 |
| 6,348,919 B1 * | 2/2002 | Murphy | 345/421 |
| 6,377,265 B1 * | 4/2002 | Bong | 345/505 |
| 6,380,935 B1 * | 4/2002 | Heeschen et al. | 345/423 |
| 6,384,833 B1 * | 5/2002 | Denneau et al. | 345/522 |
| 6,392,655 B1 * | 5/2002 | Migdal et al. | 345/582 |
| 6,525,737 B1 * | 2/2003 | Duluk, Jr. et al. | 345/506 |
| 6,765,573 B1 * | 7/2004 | Kouadio | 345/426 |
| 2002/0105551 A1 * | 8/2002 | Kamen et al. | 345/850 |

FOREIGN PATENT DOCUMENTS

JP 06298618 * 6/1996

OTHER PUBLICATIONS

U.S. Appl. No. 09/056,683, filed Apr. 18, 1998, Peercy et al.
Segal, M. et al., "Fast Shadows and Lighting Effects Using Texture Mapping," *Proc. SIGGRAPH 1992*, Jul. 1992, 26(2) 249-252.

* cited by examiner

*Primary Examiner*—Wesner Sajous
(74) *Attorney, Agent, or Firm*—Woodcock Washburn LLP

(57) ABSTRACT

One aspect of the invention is a method for data retrieval. The method includes the step of rendering geometry from a selected perspective (140) to produce a plurality of data values (130, $T'_{AB}$). The method also includes the steps of storing at least a subset of the plurality of data values (130, $T'_{AB}$) in a memory (40, 80) and computing a plurality of texture coordinates (a'–d') of the geometry from a projective transformation corresponding to the selected perspective (140). The method also includes the step of retrieving at least one of the stored data values ($T_{AB}$) that correspond to the texture coordinates (a'–d') from the memory (40, 80).

23 Claims, 2 Drawing Sheets

DATA RETRIEVAL METHOD AND SYSTEM

TECHNICAL FIELD OF THE INVENTION

The present invention relates in general to image graphics and more particularly to a data retrieval method and system.

BACKGROUND OF THE INVENTION

Graphics rendering and other visualization applications typically utilize accelerated hardware, firmware, and sometimes even software modules to perform compute-intensive rendering operations. These applications also utilize a graphics system interface such as OPENGL® or DIRECT3D® to control low-level graphics drawing operations in these accelerated modules. For example, OPENGL® utilizes a variety of low-level models such as textures which may be defined for objects within scenes, and lighting models, which may define light sources and the manner in which surfaces in the scenes reflect light therefrom. Controlling the appearance of these objects typically requires the use of complex effects such as blending, shading and texturing, and may be performed using visualization applications such as programmable or procedural shading applications. Usually, each of these operations may require significant computing time and/or resources. In many applications, including interactive applications, it may be desirable to minimize one or both of these requirements.

Most processing within a graphics pipeline is performed on all of the image pixel data that is passed thereto. A graphics system interface such as OPENGL® may be used to select various pixels and to control processing of pixel-based appearances by using multiple passes through the graphics pipeline. Unfortunately, many conventional graphics systems typically require multiple fetch operations in the graphics pipeline to be performed to retrieve both geometry data and texture data to arrive at a final appearances. Moreover, many systems also typically require a masking operation to mask or cull relevant pixels to be blended with other images in a next pass through the graphics pipeline. For example, a bounding box of geometry encompassing the stored image pixels from a prior pass is typically used by these systems to retrieve and to register the image pixels with a result in a frame buffer that has been computed in the next pass so that they may be blended in a third pass. The unnecessary pixels between the bounding box and relevant stored pixels are then culled or masked out before the blending operation. Each of these fetch and/or mask operations undesirably increases the processing time with each of these passes. These conventional systems may also reduce the flexibility with which programmable per-pixel applications may be parameterized, in addition to reducing processing speeds.

Moreover, effects such as texture and lighting are typically computed using vertices provided by the geometry data, rather than per pixel. Because each value between the vertices must then be interpolated, the final appearance is usually undesirably uneven. Some systems have implemented methods in software, or software embedded in hardware, to perform per pixel computations to even out these lighting effects. However, these systems typically suffer from slow processing time.

SUMMARY OF THE INVENTION

From the foregoing, it may be appreciated that a need has arisen for improving data retrieval mechanisms within graphics pipelines. In accordance with the present invention, a data retrieval method and system are provided that substantially eliminate or reduce disadvantages and problems of conventional systems.

One aspect of the invention is a method for data retrieval. The method includes the step of rendering geometry from a selected perspective to produce a plurality of data values. The method also includes the steps of storing at least a subset of the plurality of data values in a memory and computing a plurality of texture coordinates of the geometry from a projective transformation corresponding to the selected perspective. The method also includes the step of retrieving at least one of the stored data values that correspond to the texture coordinates from the memory.

The invention provides several important advantages. Various embodiments of the invention may have none, some, or all of these advantages. For example, one technical advantage is that the invention may be used with a variety of existing systems and may improve the speed of processing. The invention may use graphics system interfaces in a multi-pass scenario to achieve complex appearance effects such as color, texture, bump maps, lighting and other values, even for interactive processing. For example, the invention may reduce the number of operations in a graphics pipeline such as fetching or masking that might otherwise be required with conventional systems. Such an advantage may also consume fewer resources such as memory and/or processor capacity.

Another technical advantage of the present invention is that it allows texture computations to be coupled to lighting computations in graphics pipelines. Such an advantage efficiently accelerates programmable applications such as shading algorithms, which may be used to, among other things, perform lighting and bump map operations on pixels within image scenes.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE INVENTION

Figure 1:
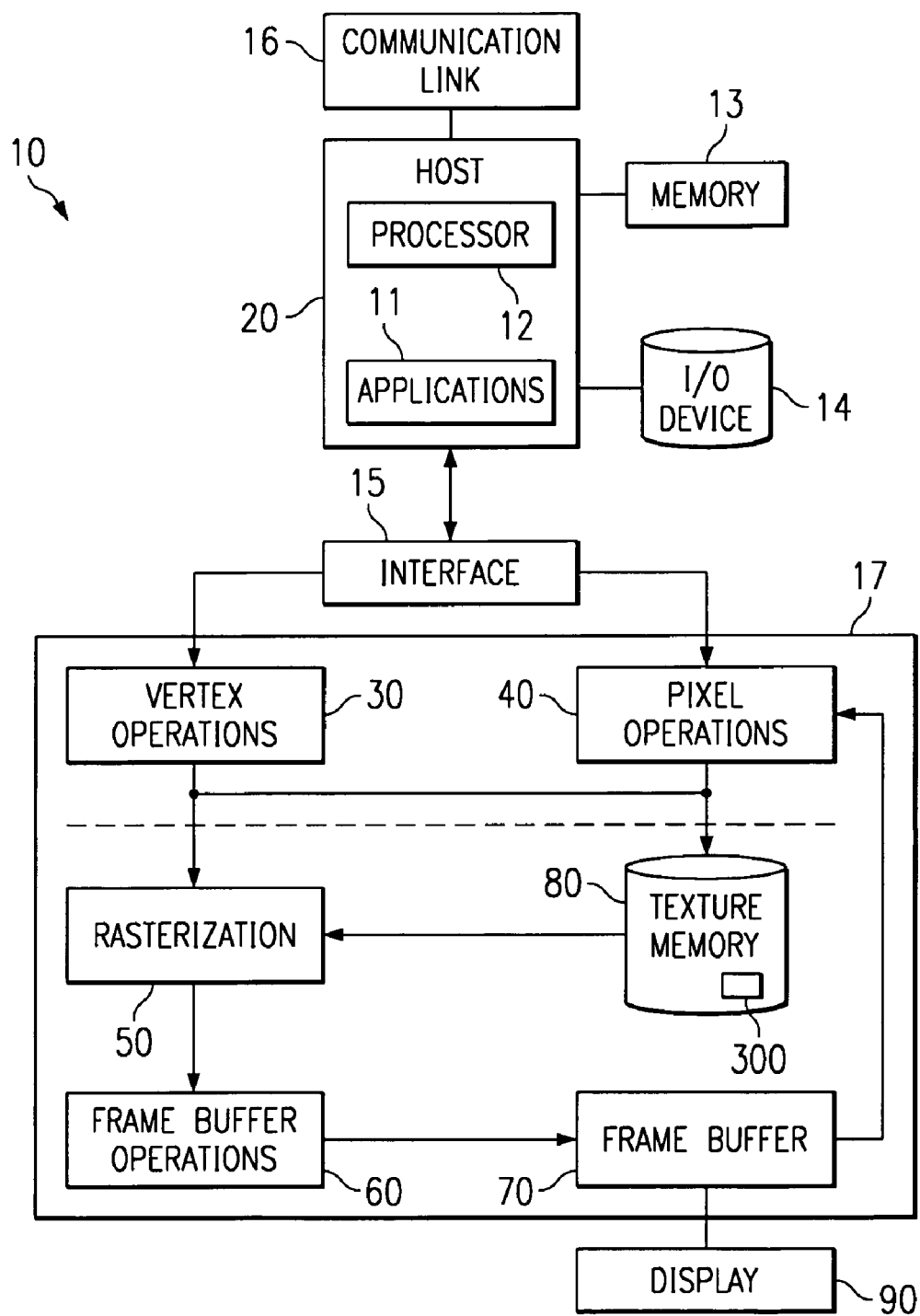
FIG. 1 is a block diagram of a graphics system.

FIG. 1 is a block diagram of a graphics system 10. Graphics system 10 includes a host 20 coupled to a graphics system interface 15 which couples to a graphics pipeline 17. Host 20 may be a general or a specific purpose computer and includes a processor 12 and a memory 13, which may include random access memory (RAM) and read only memory (ROM). Specifically, host 20 may be used to execute applications 11 having image graphics and visualization software that may be stored in memory 13 and/or an input/output device 14. Results may be displayed using display 90 and/or stored in input/output device 14, which may be any suitable storage medium. Data processing may be performed using special purpose digital circuitry contained either in host 20 or in a separate device. Such dedicated digital circuitry may include, for example, application-specific integrated circuitry (ASIC), state machines, fuzzy logic, as well as other conventional circuitry. Host 20 may also include a portion of a computer adapted to execute any of the well known MS-DOS, PC-DOS, OS2, UNIX, MAC-OS, and Windows operating systems or other operating systems including unconventional operating systems.

Host 20 may also be coupled to a communication link 16 that may be connected to a computer network, a telephone line, an antenna, a gateway, or any other type of communication link.

Interface 15 may be any software graphics or firmware interface such as OPENGL® or DIRECT3D® that includes procedures and functions and that may be used to control low-level operations in graphics pipeline 17. In operation, interface 15 is operable to control the processing of image data in graphics pipeline 17 in response to selected commands that are passed from application software 11 such as a programmable shader. Data is passed through some or all of the elements in graphics pipeline 17 and may then be transferred from frame buffer 70 to display 90 for viewing. For example, pixels may be written to and read from frame buffer 70 using OPENGL® function calls such as the DrawPixels and ReadPixels command, and the function CopyPixels can be used to copy a block of pixels from one region of frame buffer 70 to another.

More specifically, graphics pipeline 17 includes a vertex operations module 30 and a pixel operations module 40. Vertex operations module 30 and pixel operations module 40 are each coupled to a rasterization hardware 50. Rasterization hardware 50 is coupled to a frame buffer operations module 60, which in turn is coupled to a frame buffer 70. Frame buffer 70 may couple to pixel operations module 40. Pixel operations module 40 is also coupled to a texture memory 80, which is also coupled to rasterization hardware 50. Graphics pipeline 17 may include software, firmware, hardware, or a combination thereof. Interface 15 may be a standalone module, reside on host 20, or a combination thereof.

It may be helpful to illustrate a single pass through graphics pipeline 17. Because interfaces 15 such as OPENGL® are procedurally based, graphics pipeline 17 performs those low-level operations on all of the pixels passed in response to the OPENGL® procedure or function call. Host 20 sends image data to pixel operations module 40, which may utilize a lookup table to apply a scale or bias such as a color contrast or brightness to pixels passed thereto. Host 20 also sends geometry data to vertex operations module 30. The geometry data usually includes a plurality of texture coordinates or vertices (s,t,r,q) that are each projected points that correspond to a location (x,y,z,w) in an image plane. These texture coordinates may be provided by an application 11, or they may be calculated for each vertex with a computational procedure. For example, a projective transformation can be applied to the three-dimensional spatial coordinates of the vertices of the geometry to compute texture coordinates. One of many known methods for performing this process is described in "*Fast Shadows and Lighting Effects Using Texture Mapping*" by Mark Segal, Carl Korobkin, Rolf van Widenfelt, Jim Foran, and Paul Haeberli, (Proc. SIGGRAPH 1992), July 1992, pp. 249–252. The geometry data may also include normals at each of these vertices for each of the three channels (usually red, green, and blue).

These texture coordinates represent a texture map that may be mapped onto the geometry data transferred from host 20. The texture map includes selected points from the image data that correspond to one or more vertices within the geometry data. Usually, four corner vertices in a texture map define any portion of the image that is mapped to the geometry. Vertex operations module 30 transforms geometry into a raster coordinate system. Usually, this includes tessellation, or breaking down a continuously smooth geometrical surface into triangular surfaces. Each of these tesselated vertices is a texture coordinate that references a location in the texture map.

Then during the rasterization process, each point within the image between the vertices is warped onto the geometry. That is, rasterization hardware 50 usually interpolates the tessellated vertices to populate the pixels within each of these surfaces. Texture coordinates for each pixel within each triangle are interpolated into the texture map on the basis of its proximity to a vertex. This is done by enabling texturing, where, for example, rasterization hardware 50 requests a texture map from texture memory 80 which may then be applied to all of the pixels in rasterization hardware 50. These pixels are then passed to frame buffer 70.

Frame buffer operations module 60 then may perform a variety of functions on the data passed from rasterization hardware 50 and then pass this data to frame buffer 70. Some of these functions include, but are not limited to, a depth test, stencil test, and blending, and are performed on all of the pixels passed to frame buffer operations module 60. A depth test typically discards portions of an image region that fail a depth comparison. For example, the depth test may be used to clip surfaces that are further from, or are obstructed by, an object that is nearer in a field of view. A stencil test may be used as an arbitrary comparison that allows selected pixels to be rejected based on the outcome of a comparison between the value in the stencil buffer and the reference value, usually an integer. Blending usually includes operations that may be performed on the pixels in the frame buffer, such as adds, subtracts, multiplies, or clears, and is typically used when assigning color values to pixels.

System 10 may also utilize a mechanism such as an alpha channel in graphics pipeline 17 to select or exclude any portion or region of pixels as desired. The alpha channel typically passes one to three color values and is typically used for blending operations to indicate the transparency of one or more of these colors. The alpha channel may also be used in combination with an alpha test to perform per pixel exclusions in circumvent any implementation-specific requirements imposed on textures by procedures in interface 15. An alpha test may be controlled by using an AlphaFunc to discard portions of an image conditional on the outcome of a comparison between the incoming portion's alpha value and a constant value. For example, a desired region may be selected and copied using OPENGL's® Copy Function with alpha test enabled. Those pixels that pass the condition are copied in the alpha channel and activate the stencil bit, thus passing the pixels within the desired region. This process may be used in several passes through graphic pipeline 17 to build up the result in the alpha channel (more generally in frame buffer 70). More generally, any color channel may be used to set a color, and then these pixels values may be copied to the alpha channel. An operation may be performed for each of the three color channels. When frame buffer 70 has performed this operation on all of the pixels, the pixels are usually sent to a display 90.

Where programmable applications 11 such as shading algorithms are used to model the appearance of objects, an artist typically describes the appearance of one or more portions of an image by selecting those pixels that should be altered. For example, a programmable shading algorithm may be used to provide various atmospheric, light, shading, surface details, textures, and/or colors. These functions may parameterize the appearance of selected objects. Application 11 may instruct interface 15 to perform functions using graphics pipeline 17 that return texture values representing, but not limited to, texture maps, environment maps, bump maps, and shadow depth maps. Shadow depth maps are images as seen from a particular view point, are normally associated with a light source and represent a depth buffer rendered from the point of view of the light source. Similarly, bump maps typically define a normal vector that may be added to a surface normal that is included with geometry data passed from host 20. Light may be simulated by modeling the interaction of light at the surface and in the interior of the region of space. Parameters such as the physics of material can be simulated or be used to create special materials by modeling the interaction of light with such materials.

Complex appearance effects may be programmed with, for example, application 11 used in conjunction with interface 15. Because graphics pipeline 17 performs the same operation on each pixel passed thereto, complex or numerous effects are usually processed in a multi-pass scenario through graphics pipeline 17. In multiple passes through graphics pipeline 17, additional geometry data and image data are passed from host 20 and may be blended with data processed in a prior pass. This data may be stored in a memory such as texture memory 80 or pixel operations module 40. Methods for providing texture maps for this data processed in the prior pass without retrieving geometry data again therefor are discussed in further detail in conjunction with FIGS. 2 and 3.

Figure 2:
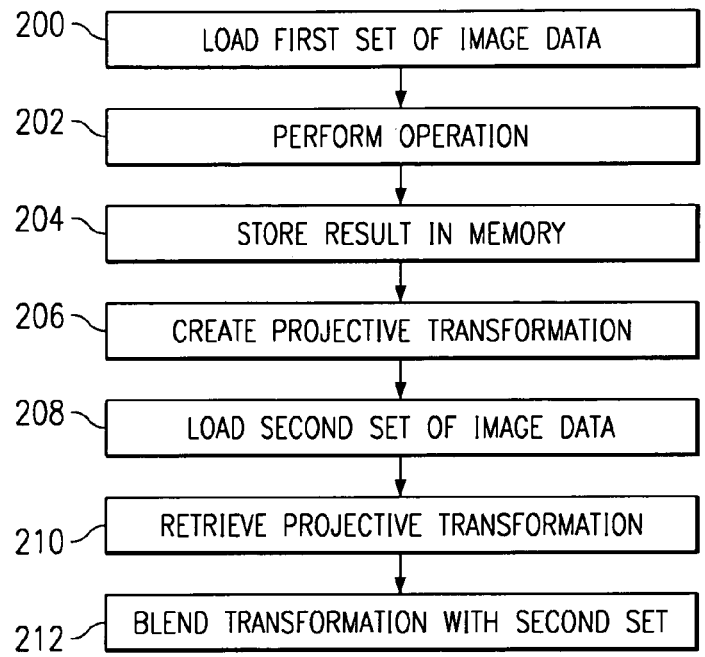
FIG. 2 illustrates a method for data retrieval.

FIG. 2 illustrates a method for data retrieval. A final appearance $c_i$ may be produced using a variety of functions in a programmable application 11 such as RenderMan or a procedural shader. A shading language such as RenderMan may be translated into multiple passes through a graphics pipeline 17 driven by a graphics interface 15 such as OPENGL®. Details for one method to perform such a translation may be found in co-pending U.S. patent application Ser. No. 09/056,583, entitled "System and Method for High-Speed Execution of Graphics Application Programs Including Shading Language Instructions", filed Apr. 8, 1998.

It may be illustrative to describe the method using a final appearance $c_i$ of a scene that is produced as a sum of products of three various portions of a scene with selected textures, lighting, etc. applied. For example, a final appearance $c_i$ may be represented by the equation $c_i=A*B+C$. In this example, A, B, and C each represent a portion of a scene or an object therein that includes a plurality of pixels. Each of scenes A, B, and C may be loaded into frame buffer 70 from host 20 and/or may be generated by one or more passes through graphics system 10. For example, scene A may include pixels within a portion of an image that represent a rippled pool, scene B may include pixels that overlap with scene A and that represent objects within the pool, and so forth. The final appearance $c_i$ may be obtained by blending these objects using graphics pipeline 17, in this case a sum of products. The method may include additional steps such as, but not limited to, breaking down the representation of $c_i$ into the least number of steps to improve processing efficiency. To illustrate one aspect of the invention, the operation A*B may be performed first. This intermediate result may then be summed with C to yield final appearance $c_i$.

Final appearance $c_i$ may be obtained by using multiple passes through graphics system 10, where frame buffer 70 performs one operation per pass. In step 200, a first plurality of pixels may be loaded into frame buffer 70, in this case object A. Then, a plurality of pixels of object B are blended or multiplied by each pixel of object A to produce a resultant texture image scene 130 in screen space (s,t) in step 202. This result may be stored in a storage medium, such as texture memory 80 or pixel operations module 40, in step 204 by a variety of methods. For example, the result may be stored in a result $T'_{AB}$ by first allocating an adequate amount of storage space in, and then copying result $T'_{AB}$ to, texture memory 80 or pixel operations module 40.

In step 206, result $T'_{AB}$ may be retrieved by first creating a mechanism for performing texture coordinates per vertex of a geometry. These texture coordinates may then be interpolated to provide texture coordinates at each pixel of the scene. This step may be performed in two phases. First, a projective transformation $T_{AB}$ of result $T'_{AB}$ may be provided to yield the desired texture value to be projected onto result $T''_{AB}$. Second, texture values for each pixel within projective transformation $T_{AB}$ may be computed to provide projective transformation $T_{AB}$ using lighting equations, and is discussed below.

Figure 3:
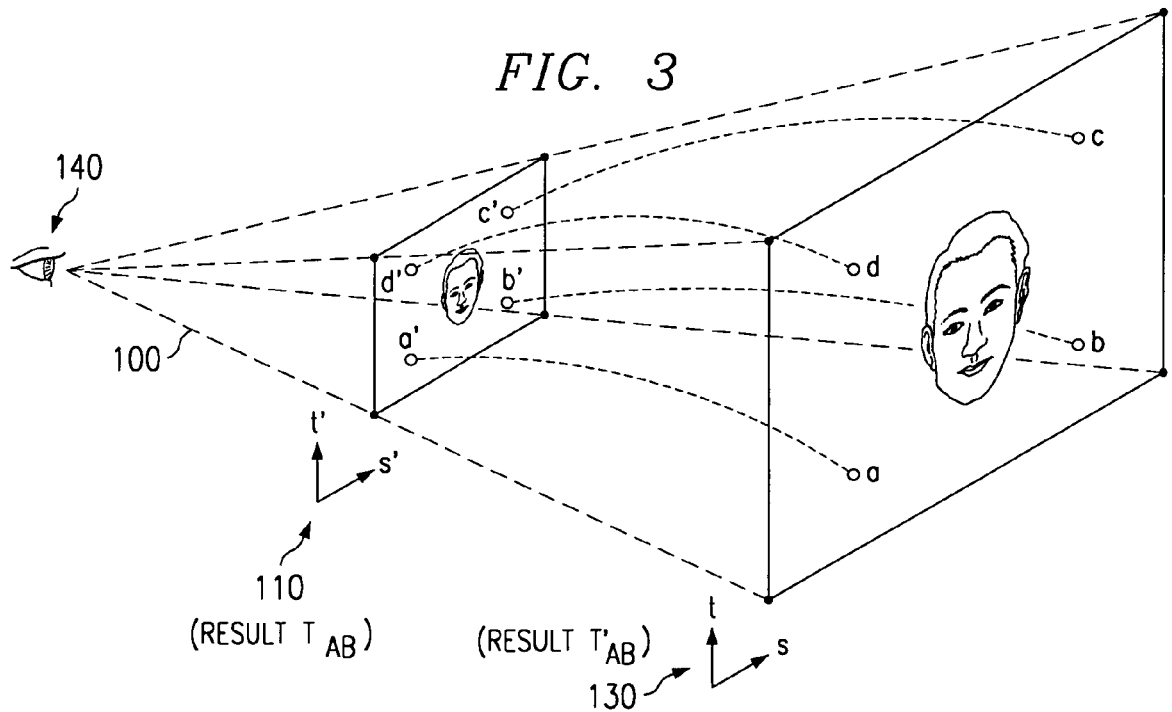
FIG. 3 graphically illustrates an example of a projective transformation that may be used in the method described in FIG. 2.

One example for creating a projective transformation $T_{AB}$ is discussed in further detail in conjunction with FIG. 3. This process provides the advantage of retrieving result $T'_{AB}$ and creating projective transformation $T_{AB}$ so that is positioned correctly in frame buffer 70 relative to image C, effectively registering projective transformation $T_{AB}$ to image C. Thus, retrieval of $T'_{AB}$ from texture memory 80 or pixel operations module 40 maintains correspondence of the texture map with the image that is in frame buffer 70.

This step also provides geometry data while applying texture to the geometry approximately simultaneously. Such an advantage also eliminates the need for culling excess data with the use of a bounding box which usually requires geometry data such as color or normal data to be fetched from host 20, because the data is typically not maintained with the use of a bounding box. Thus, the process also eliminates the need for multiple fetch operations to retrieve geometry and texture data. This step thus results in reduced system computing and memory requirements.

Providing texture values per pixel using lighting equations may be performed using two steps. First, a lighting model may be created to provide values for each pixel, rather than at each vertex. Second, texture values may be computed using this result to provide the desired texture coordinates at each pixel of the scene. These lighting equations typically require many parameters, such as specular data, orientation of a normal vector from a bump map, and proximity of the light source. To illustrate, final lighting appearance $c_{li}$ as discussed above, may also be represented by a diffuse lighting model such as $c_{li}=c_t*(n\cdot V)^m$, where V is an angle vector relative to the normal n, and m represents the number of angles used to create the diffuse appearance. Rather than performing this lighting model at each vertex, this lighting model is desirably performed for each pixel in the scene to avoid uneven results that may be caused by interpolating values within each triangle between vertices. Many methods may be used to perform this method. One method for performing this method in a graphics pipeline 17 includes an extension that may be used with OPENGL®. This extension was developed by Silicon Graphics, Inc. (SGI), and may be termed fragment lighting, which is a lighting stage in a graphics pipeline that occurs during fragment processing after a texture has been fetched from memory.

Fragment lighting provides a mechanism for computing 'per-pixel lighting'. When enabled, fragment lighting computes a color for each rasterized fragment by applying an equation defined by a lighting model to a collection of parameters that can include the fragment coordinates, the coordinates of one or more light sources, the fragment normal, and parameters defining the characteristics of the light source and current diffuse, specular, and ambient fragment material.

For example, final fragment lighting appearance $c_f$ may be represented by the relationships:

| | |
|---|---|
| $c_f = E_m$ | emissive |
| $+ A_m*A_s+$ | ambient material*scene ambient color |
| SUM {for all of the fragment light sources i} { | |
| Atten(i)*SpotL(i)*{ | distance/spot light attenuation |
| $+ A_m*A_l(i)$ | ambient material*ambient light |

-continued

```
    + D_m*D_l(i)*(n.L)(i)        diffuse material*diffuse light
    + S_m*S_l(i)*f(i)(n.H_sn)(i)^sn   specular material*specular light
    }
}
```

This equation represents the same vertex lighting equation that may be used in OpenGL®, but in this example, the normal vector may be interpolated from the vertices of geometry to each pixel. To compute the illumination terms for each fragment, eye coordinates of the fragment may be used to compute the light direction, half angle vector, and attenuation factor in a manner similar to that used in the vertex lighting computations.

A texture may now be applied using the lighting model that has been provided per pixel to the retrieved result $T'_{AB}$. To illustrate, final lighting appearance $c_{fi}$ may also be represented by color operators that simulate mixing and filtering of light may be used in providing common lighting and shading attributes to a scene. These lighting attributes include, but are not limited to, ambient, diffused, and specular and may be represented by an equation such as $c_{fi}=c_t*$ (n·L). A texture color $c_t$ may represent the color of a texture to be applied to image pixel data, and the value (n·L) may be derived from the texture provided in projective transformation $T_{AB}$, where n is the normal to the vertex and L is a vector in a direction to a light source. Many methods for providing this texture may be used. One method for providing this texture map in a graphics pipeline 17 includes an extension that may be used with OPENGL®. This extension was also developed by SGI and may be termed light texture.

Light texture provides a general mechanism for substituting the color computed during texture processing in place of other fragment attributes such as the fragment normal, or as sources for some of the computations in the fragment processing pipeline, such as material or light parameters in the fragment lighting computations. When used as the fragment normal, the red, green and blue components (R,G, B) of the texture color may be used to compute the components $n_x$, $n_y$, and $n_z$ of the fragment normal vector:

$n_x=2*R-1$
$n_y=2*G-1$
$n_z=2*B-1$

In effect, texture color components may be scaled and biased so that their range is [−1,1]. The texture color may also directly replace one of the lighting parameters, such as light color, light attenuation, diffuse material, specular material, ambient material, or shininess. The resulting projected transformation $T_{AB}$ may be stored in texture memory 80 or pixel operations module 40 for future processing in step 212.

Then in step 208, object C may be loaded into frame buffer 70. In step 210, projected transformation $T_{AB}$ may then be retrieved from texture memory 80 or pixel operations module 40. Each pixel of C may then be blended or added to projected transformation $T_{AB}$ in step 212 to produce the resultant texture image $c_i$. Alternatively, object C may first be loaded into frame buffer and result $T'_{AB}$ may be retrieved. Also alternatively, each operation may be performed approximately simultaneously per pixel, where graphics pipeline 17 is designed to support parallel and/or per pixel processing.

FIG. 3 graphically illustrates one example of a projective transformation that may be used in the method described in FIG. 2. Texture parameters such as diffuse color and normal values that are used in the method described above may be provided by mapping texture coordinates to selected coordinates within a desired image scene. That is, the coordinates provide an index to a location within the texture map.

To illustrate, a perspective viewing pyramid 100 may be used to illustrate the relationship between scenes 110 and 130, results $T_{AB}$ and $T'_{AB}$, respectively. For example, scene 110 represents a focal plane of scene 130 from a desired perspective 140, in this example, that of a user. Scene 130 represents a plurality of image pixels that may be desirably retrieved for further processing in graphics pipeline 17. Scene 130 is a screen representation in a s–t plane of an image that may have been computed in graphics pipeline 17. Scene 130 may be stored in any storage medium, such as texture memory 80 or pixel operations module 40. Scene 110 illustrates an image plane formed by texture coordinates s',t' for a desired geometry onto which scene 130 is projected from a viewer perspective. That is, for each point a–d in scene 130, a projected texture coordinate a'–d' is computed in scene 110. In this example, s and t are locational screen space image coordinates that may be mapped to texture coordinates s' and t' for the projected texture image scene 110. For example, the texture image may be mapped to a geometry such as a sphere at vertices that may be tessellated to the image during rasterization.

One method for performing such a projection includes a projective textures mechanism in an OPENGL® interface 15. Projective textures may be used to apply a texture to selected coordinates and may be invoked by, for example, an OPENGL® glTexGen command to compute texture coordinates for every vertex in an image scene 130. For example, texture generation procedures using special functions allow selection of an image plane in a variety of orientations from a variety of perspectives 140, such as a viewer or a spotlight. These procedures allow regeneration of textures at any of these selected planes. Thus, scene 110 may be retrieved from texture memory 80 or pixel operations module 40 by using a projective transformation, thus providing texture coordinates that are regenerated for scene 110.

Projective textures may also interpolate between each of the vertices to provide a texture map for every pixel in the scene. Referring to FIG. 3, these pixel texture values are computed from a projective point in an image scene 130 onto an object in a desired scene 110. This allows correspondence of scene 110 to be maintained with a next image scene that may be in frame buffer 70, effectively registering scene 110 to the next image scene. Scene 110 may then retrieved from texture memory 80 or pixel operations module 40 to the same location that it had been in frame buffer 70 for further processing and finally blending with the image in frame buffer 70. Thus, the process does not require the scene of interest to be bounded with a polygon and filtered using stencil bits for an alpha mask. Further, the process provides texture data such as color or normal data, that are typically not maintained with the use of the bounding box. These texture data may be used in further computations. Moreover, this process may retrieve the texture for scene 110 with one fetch from texture memory 80 or pixel operations module 40. Such advantages may eliminate the need for geometry data for scene 110 to be sent from host 20, thus reducing memory and processing resources and the time needed to retrieve the desired scene for further processing.

The data (scene 110) retrieved from texture memory 80 or pixel operations module 40 may then be further processed in graphics pipeline 17 via multi-pass operations by using methods such as fragment lighting and light texture discussed in conjunction with FIG. 2 to provide the final projective transformation $T_{AB}$ and bump maps that may be computed.

Thus, it is apparent that there has been provided in accordance with the present invention, a data retrieval system and method that satisfies the advantages set forth above. Although the present invention has been described in detail, it should be understood that various changes, substitutions, and alterations may be readily ascertainable by those skilled in the art and may be made herein without departing from the spirit and scope of the present invention as defined in the following claims.

What is claimed is:

1. A method for data retrieval, comprising:
rendering geometry from a selected perspective;
producing a plurality of image data values as a function of the rendered geometry;
storing at least a subset of the plurality of image data values in memory;
projecting a texture onto the geometry to create a projective transformation corresponding to the selected perspective;
computing a texture value as a function of the projecting; and
retrieving at least one of the stored image data values that correspond to the texture value from the memory in order to reduce the number of times such image data value has to be retrieved.

2. The method of claim 1, further comprising copying the at least one of the stored image data values into a second memory.

3. The method of claim 1, further comprising blending the at least one of the stored image data values with another plurality of image pixels in a frame buffer.

4. The method of claim 1, further comprising generating a desired appearance for at least one of a group consisting of color, lighting parameters and elevation maps for the texture values.

5. The method of claim 1, wherein the memory is a frame buffer in a graphics pipeline.

6. The method of claim 1, wherein the step of projecting includes computing at least one of a group consisting of a color vector and a normal vector for the at least one of the stored image data values.

7. A data retrieval system comprising:
a memory; and
a graphics system interface operable to control rendering geometry from a selected perspective to produce a plurality of image data values, the graphics system interface further operable to cause at least a subset of the plurality of image data values to be stored in a memory, the graphics system interface further operable to project a texture onto the geometry to create a protective transformation corresponding to the selected perspective and to compute a texture value as a function of the projection, and the graphics system interface further operable to cause at least one of the stored image data values that correspond to the texture value to be retrieved from the memory in order to reduce the number of times such image data value has to be retrieved.

8. The system of claim 7, wherein the memory is a frame buffer in a graphics pipeline.

9. The system of claim 7, wherein the graphics system interface is operable to copy the at least one of the stored image data values into a second memory.

10. The system of claim 7, wherein the graphics system interface is operable to cause the at least one of the stored image data values to be blended with another plurality of image pixels in a frame buffer in a graphics pipeline.

11. The system of claim 7, wherein the graphics system interface is operable to generate a desired appearance for at least one of a group consisting of color, lighting parameters and elevation maps from the texture value.

12. The system of claim 7, wherein the graphics system interface is further operable to compute at least one of a group consisting of a color vector and a normal vector for at least one of the stored image data values.

13. The system of claim 7, wherein the graphics system interface is operable to perform at least a subset of the functions of those performed by the graphics system interface sold under the trademark OPENGL®.

14. An application for retrieving data, comprising:
a computer readable medium; and
software resident on the computer readable medium and operable to cause a graphics system interface to render geometry from a selected perspective to produce a plurality of image data values, to cause at least a subset of the plurality of image data values to be stored in memory, to protect a texture onto the geometry to create a projective transformation corresponding to the selected perspective and to compute a texture value as a function of the projection, and to cause at least one of the stored image data values that correspond to the texture value to be retrieved from the memory in order to reduce the number of times such image data value has to be retrieved.

15. The application of claim 14, wherein the software is further operable to cause the at least one of the stored image data values to be copied into a second memory.

16. The application of claim 14, wherein the memory is a frame buffer in a graphics pipeline.

17. The application of claim 14, wherein the software is further operable to cause a desired appearance for at least one of a group consisting of color, lighting parameters and elevation maps from the texture value to be generated.

18. The application of claim 14, wherein the software is further operable to cause at least one of the group consisting of a color vector and a normal vector to be computed for the at least one of the stored image data values.

19. The application of claim 14, wherein the application is further operable to cause the at least one of the stored image data values to be blended with another plurality of image pixels in a frame buffer of a graphics pipeline.

20. The system of claim 7, wherein the graphics system interface is operable to perform at least a subset of the functions of those performed by the graphics system interface sold under the trademark OPENGLO®.

21. The method of claim 1, wherein the texture value comprises texture coordinates.

22. The system of claim 7, wherein the texture value comprises texture coordinates.

23. The application of claim 14, wherein the texture value comprises texture coordinates.

* * * * *